United States Patent
Ishikawa et al.

(10) Patent No.: US 6,611,090 B1
(45) Date of Patent: Aug. 26, 2003

(54) ANTI-REFLECTIVE COATING FOR A CRT HAVING FIRST AND SECOND OPTICAL THIN FILMS IN COMBINATION WITH AN ADHESION LAYER

(75) Inventors: Hiroichi Ishikawa, Kanagawa (JP); Kazuo Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/360,625

(22) Filed: Jul. 26, 1999

(30) Foreign Application Priority Data

Jul. 31, 1998 (JP) .......................... P10-218364

(51) Int. Cl.$^7$ ................................ H01J 29/10
(52) U.S. Cl. ............... 313/461; 313/112; 313/477 R; 313/479
(58) Field of Search .................. 313/110, 112, 313/113, 477 R, 478, 466, 479–80, 489, 492, 634; 359/580, 588, 888, 759, 585–86, 589; 428/215, 212, 432, 698–99, 701–2, 426, 472, 446, 457, 469; 348/834–35

(56) References Cited

U.S. PATENT DOCUMENTS

| | | | |
|---|---|---|---|
| 5,407,733 A | * 4/1995 | Bjornard et al. ............ 428/216 |
| 5,728,456 A | 3/1998 | Adair et al. | |
| 5,852,513 A | * 12/1998 | McDole et al. ............ 359/580 |
| 5,858,519 A | * 1/1999 | Klinger et al. ............ 428/212 |
| 5,874,801 A | * 2/1999 | Kobayashi et al. ......... 313/478 |

FOREIGN PATENT DOCUMENTS

| | | |
|---|---|---|
| EP | 0 753 762 A1 | 1/1997 |
| EP | 0 836 216 A2 | 4/1998 |
| EP | 0 854 202 A2 | 7/1998 |
| JP | 09 156964 A | 6/1997 |

* cited by examiner

Primary Examiner—Vip Patel
Assistant Examiner—Joseph Williams
(74) Attorney, Agent, or Firm—Bell, Boyd & Lloyd LLC

(57) ABSTRACT

An anti-reflection film having superior anti-reflection properties and which is suited for practical application is to be manufactured easily and simply with high productivity and a reduced manufacturing cost. To this end, there are sequentially formed by layering, an adhesive layer 4, a first optical thin film 5, containing one or more of titanium nitride, hafnium nitride and zirconium nitride, and a second optical thin film 6 having a refractive index of 1.35 to 1.7. The adhesive layer 4 is represented by the chemical formula of $SiO_x$, where $x<2$. If the first optical thin film 5 mainly contains titanium nitride, the first optical thin film 5 preferably is electrically conductive. The second optical thin film 6 is preferably formed of $SiO_2$. A cathode ray tube may be provided by arranging the resin substrate 3, carrying the respective layers, on a face plate side of the display portion, with the remaining configuration of the anti-reflection film being the same as above.

7 Claims, 7 Drawing Sheets

ANTI-REFLECTIVE COATING FOR A CRT HAVING FIRST AND SECOND OPTICAL THIN FILMS IN COMBINATION WITH AN ADHESION LAYER

RELATED APPLICATION DATA

The present application claims priority to Japanese Application No. P10-218364 filed Jul. 31, 1998, which application is incorporated herein by reference to the extent permitted by law.

BACKGROUND OF THE INVENTION

1. Field of the Invention

This invention relates to an anti-reflection film and a cathode ray tube. More particularly, it relates to an anti-reflection film that is able to improve tightness of adhesion of the thin optical film to a substrate, and to achieve anti-reflection effects over a wide wavelength range, and a cathode ray tube employing this anti-reflection film.

2. Description of the Related Art

Up to now, an anti-reflection film has been used in the optical and in electro-optical field where it is desirable or necessary to decrease the refractive index on an optical interface between air and glass. Specifically, the field of usage for the anti-reflection film covers a wide field encompassing a camera lens, a platen for a copying machine, cover glass for equipments, a panel for a cathode ray tube (CDT) and other display devices.

This anti-reflection film may be enumerated by a film configured as shown for example in FIG. 1. This film is comprised of a resin substrate 101, on a major surface 101a of which are sequentially formed a first layer 102 of SiOx, where x<2, having a thickness of 10 nm, a second layer 103 of ITO, having a thickness of 20 nm, a third layer of SiO2, having a thickness of 25 nm, a fourth layer 105 of ITO, having a thickness of 60 nm, and a fifth layer 106 of SiO2, having a thickness of 100 nm.

This anti-reflection film has, however, an inconvenience that it has a multi-layered structure with as many as five layers, and a thicker total film thickness of 215 nm, so that it is difficult and pains-taking to manufacture, while being poor in productivity and high in production cost.

Thus, a demand is raised for an anti-reflection film having a smaller number of layers. If the number of layers is smaller, the number of layering steps is decreased to facilitate the production and improve the productivity as well as to lower the production cost.

In order to meet this demand, there has been proposed an anti-reflection film of a dual structure having on a substrate a thin film mainly composed of TiN and an $SiO_2$ thin film of lower refractive index, as a second optical film, as disclosed in Japanese Laying-Open Patent H-9-156964, Japanese Laying-Open Patent H-9-165231 or in Japanese Laying-Open Patent H-9-73001.

However, this anti-reflection film, while having acceptable anti-reflection characteristics, is not optimum in adhesion between the substrate and the thin film, mainly composed of TiN, such that the film is susceptible to exfoliation and difficult to use practically.

SUMMARY OF THE INVENTION

It is therefore an object of the present invention to provide a practically useful anti-reflection film which has a small number of layers and high productivity and which is easy and simple to manufacture while being low in production cost and superior in anti-reflection characteristics.

It is another object of the present invention to provide anti-reflection sheet and a cathode ray tube employing this anti-reflection film.

According to the present invention, there is provided an anti-reflection film wherein an adhesive layer is formed on a major surface of a resin substrate, a first optical thin film containing one or more of titanium nitride, hafnium nitride or zirconium nitride is formed on the adhesive layer, and wherein a second optical thin film having a refractive index of 1.35 to 1.7 is formed on the first optical thin film.

Preferably, the adhesive layer is represented by the chemical formula of $SiO_x$, where x<2. The adhesive layer may be formed of a compound represented by the chemical formula of $SiN_x$, where x<4/3, or by the chemical formula of $SiO_xN_y$, where x<2 and y<4/3.

If, when the adhesive is formed of a compound having the chemical formula $SiO_x$, where x<2, sufficient bonding strength between the resin substrate and the first optical thin film cannot be developed. If the value of x is too small, silicon is metallized to increase undesirably the optical absorption characteristics to impair the anti-reflection characteristics.

In the anti-reflection film of the present invention, the adhesive layer may predominantly be composed of Ti.

In the anti-reflection film of the present invention, the physical film thickness of the adhesive layer is preferably not larger than 10 nm and more preferably 1 to 7 nm. If the physical film thickness of the adhesive layer is thicker than 10 nm, optical absorption characteristics of the adhesive layer become excessive to impair undesirably the anti-reflection characteristics. If the physical film thickness is thinner than 1 nm, sufficient bonding strength between the resin substrate and the first optical thin film undesirably cannot be developed.

In the anti-reflection film of the present invention, the physical film thickness of the first optical thin film is preferably 5 to 25 nm. If the physical film thickness is outside this range, sufficient anti-reflection characteristics cannot be achieved.

In the anti-reflection film of the present invention, it is desirable for the first optical thin film to contain mainly titanium nitride and for titanium nitride to be doped with metal. This metal may be exemplified by tungsten and gold.

If the first optical thin film mainly contains titanium nitride, the first optical thin film desirably is electrically conductive.

In the anti-reflection film of the present invention, the first optical thin film preferably is composed of $SiO_2$, while the physical film thickness of the second optical thin film preferably is 60 to 110 nm. If the second optical thin film composed of $SiO_2$ is outside the above range, sufficient anti-reflection characteristics cannot be obtained.

In the anti-reflection film of the present invention, a hard coating layer preferably is formed on the surface of the resin substrate facing the adhesive layer, while an adhesive layer preferably is formed on the hard coating layer.

The above-described anti-reflection film of the present invention may be arranged on the face plate surface of a display portion to constitute the cathode ray tube.

In the cathode ray tube of the present invention, it is preferred that the first optical thin film of the anti-reflection film predominantly contains titanium nitride, this first optical thin film being electrically conductive and grounded.

In the anti-reflection film of the present invention, since the adhesive layer is formed on the major surface of the resin substrate, the first optical thin film containing one or more of titanium nitride, hafnium and zirconium nitride is formed on the adhesive layer, and the second optical thin film having the refractive index of 1.35 to 1.7 is formed on the first optical thin film, the number of layers is small to facilitate and simplify the manufacturing process to reduce the cost.

In the anti-reflection film of the present invention, since the adhesive layer is interposed between the resin substrate and the first optical thin film containing one or more of titanium nitride, hafnium and zirconium nitride, the first optical thin film is not liable to be detached from the resin substrate to assure good practically suitable anti-reflection characteristics.

Therefore, in the cathode ray tube of the present invention, in which the anti-reflection film of the present invention is arranged on the surface of the face plate of the display portion thereof, the anti-reflection characteristics are similarly good and practically suitable.

Also, in the anti-reflection film of the present invention, if the adhesive layer is formed of a compound represented by the chemical formula of SiOx, where x<2, the first optical thin film is less liable to be detached from the resin substrate.

If, in the anti-reflection film of the present invention, the first optical thin film mainly is composed of titanium nitride, and the first optical thin film is electrically conductive, the first optical thin film may be used as an electrically conductive film in place of the ITO layer used as an electrically conductive film in the conventional anti-reflection film.

Also, if, in the anti-reflection film of the present invention, the first optical thin film is formed of titanium nitride, having strong absorption characteristics, and the anti-reflection film is arranged on the face plate surface of the cathode ray tube, the image displayed on the cathode ray tube can be improved in contrast.

In the anti-reflection film of the present invention, in which an adhesive layer is formed on a major surface of a resin substrate, a first optical thin film containing one or more of titanium nitride, hafnium nitride or zirconium nitride is formed on the adhesive layer and in which a second optical thin film having a refractive index of 1.35 to 1.7 is formed on the first optical thin film, the number of layers is small, so that the manufacture may be facilitated and simplified to reduce the manufacturing cost to improve the productivity.

In the anti-reflection film of the present invention, in which an adhesive layer is interposed between the resin substrate and the first optical thin film containing one or more of titanium nitride, hafnium nitride or zirconium nitride, the first optical thin film is not liable to be detached from the resin substrate to assure good and practically acceptable anti-reflection characteristics.

In the cathode ray tube in which the anti-reflection film of the present invention is arranged on the face plate surface side of a cathode ray tube, the anti-reflection characteristics are similarly good and practically acceptable.

If, in the anti-reflection film of the present invention, the adhesive layer is formed of a compound represented by the chemical formula $SiO_x$, where x<2, it is possible to suppress detachment of the first optical thin film from the resin substrate 3 further.

If, in the anti-reflection film of the present invention, the first optical thin film is mainly composed of titanium nitride, and the first optical thin film is electrically conductive, the first optical thin film may be used as an electrically conductive film in place of the ITO layer used as the electrically conductive film in the conventional anti-reflection film to render it unnecessary to provide an electrically conductive film to improve the productivity.

Also, in the anti-reflection film of the present invention, if the first optical thin film is formed of titanium nitride, having strong absorption characteristics, and the anti-reflection film is provided on the face plate side of the cathode ray tube as in the present invention, the image displayed on the cathode ray tube may be improved in contrast.

DETAILED DESCRIPTION OF THE INVENTION

Figure 1:
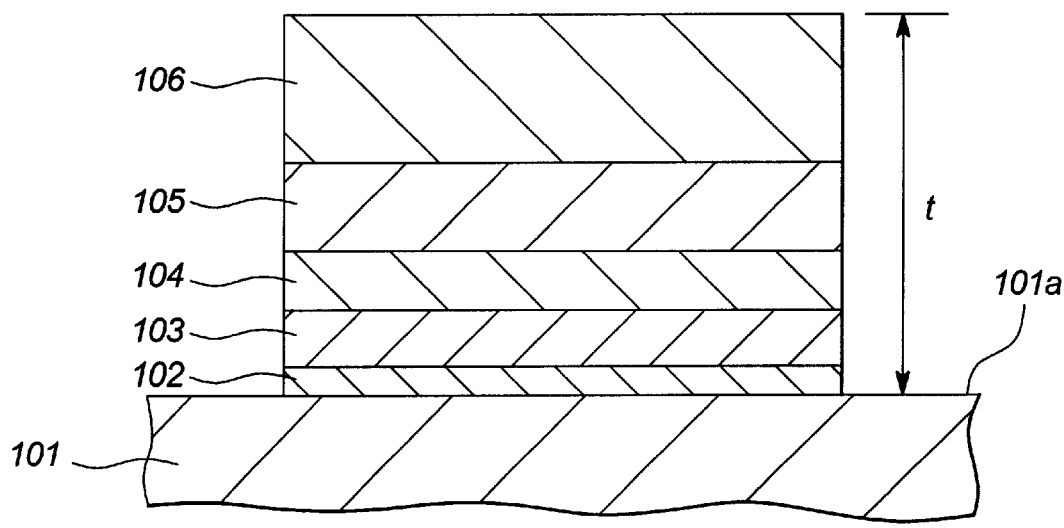
FIG. 1 is a cross-sectional view schematically showing the structure of a conventional anti-reflection film.

Referring to the drawings, preferred embodiments of the present invention will be explained in detail.

Figure 2:
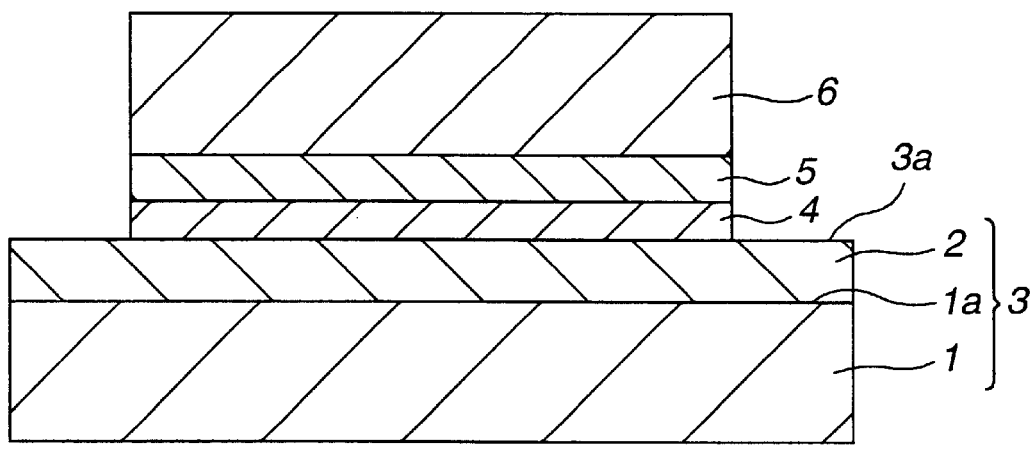
FIG. 2 is a cross-sectional view schematically showing the structure of an anti-reflection film according to the present invention.

The anti-reflection film according to the present invention is configured as shown for example in FIG. 2. That is, there are formed, on major surface 3a of a resin substrate 3, comprised of a thin-film substrate 1 of resin, such as polyethylene terephthalate, on a major surface is of which is formed a hard coating layer 2 of resin, such as acrylic resin, there are sequentially layered an adhesive layer 4, a first optical thin film 5 containing one or more of titanium nitride, hafnium nitride and zirconium nitride, and a second optical thin film 6 having a refractive index of 1.35 to 1.7.

In the anti-reflection film of the present invention, the adhesive layer 4 is preferably of a compound represented by the chemical formula $SiO_x$, where x<2. The adhesive layer 4 may also be of a compound represented by the chemical formula of $SiN_x$, where x<4/3, or of a compound represented by the chemical formula of $SiO_xN_y$, where x<2 and y<4/3.

If, with the adhesive layer 4 represented by the chemical formula $SiO_x$, where x<2, x is not less than 2, sufficient bonding strength cannot be developed between the resin substrate 3 and the first optical thin film 5, whereas, if x is too small, silicon is metallized and undesirably exhibits stronger optical absorption properties to impair the anti-reflection characteristics.

In the anti-reflection film of the present invention, the adhesive layer 4 may be mainly composed of Ti.

In the anti-reflection film of the present invention, the physical film thickness of the adhesive layer 4 is preferably not larger than 10 nm and more preferably 1 to 7 nm. If the physical film thickness of the adhesive layer 4 is thicker than 10 nm, the adhesive layer 4 undesirably exhibits stronger optical absorption properties to impair the anti-reflection characteristics. If the physical film thickness is smaller than 1 nm, sufficient bonding strength between the resin substrate 3 and the first optical thin film 5 undesirably cannot be developed.

In the anti-reflection film of the present invention, the physical film thickness of the adhesive layer 4 is preferably 5 to 25 nm. If the physical film thickness is outside this range, it is difficult to secure sufficient anti-reflection characteristics.

In the anti-reflection film of the present invention, it is desirable for the first optical thin film 5 to be mainly composed of titanium nitride, while it is also desirable for titanium nitride to be doped with metal. The metal may be exemplified by tungsten and gold.

If the first optical thin film 5 is mainly composed of titanium nitride, the first optical thin film 5 desirably is electrically conductive.

In the anti-reflection film of the present invention, the second optical thin film 6 is preferably composed of $SiO_2$. In this case, the physical film thickness of the second optical thin film 6 composed of $SiO_2$ is preferably 60 to 110 nm. If the second optical thin film 6 formed of $SiO_2$ is outside the above range, it is difficult to develop sufficient anti-reflection characteristics.

In the anti-reflection film of the present invention, the second optical thin film 6 may also be composed of $MgF_2$ or $Al_2O_3$.

As a specified example of the anti-reflection film according to the present invention, a substrate formed of polyethylene terephthalate is used as a thin-film substrate 1. The hard coating layer 2 is provided thereon to provide a resin substrate 3. The adhesive layer 4 is formed by a thin film, 5 nm in thickness, having a chemical formula of $SiO_x$, where x<2, while the first optical thin film 5 is formed by a thin film 13.6 nm in thickness formed of TiN and the second optical thin film 6 is formed by a thin film 88 nm in thickness formed of $SiO_2$.

That is, the anti-reflection film according to the present invention has the adhesive layer 4 formed on the major surface 3a of the resin substrate 3. The first optical thin film 5 containing one or more of titanium nitride, hafnium nitride and zirconium nitride is formed on the adhesive layer 4, while the second optical thin film 6 with the refractive index of 1.35 to 1.7 is formed. Thus, the number of layers is smaller and the manufacture is easy and simplified to reduce the production cost to improve the productivity.

In the anti-reflection film according to the present invention, since the adhesive layer 4 is interposed between the resin substrate 3 and the first optical thin film 5 containing one or more of titanium nitride, hafnium nitride and zirconium nitride, the first optical thin film 5 is not liable to be detached from the resin substrate 3 to improve the anti-reflection characteristics.

If, in the anti-reflection film according to the present invention, the adhesive layer 4 is formed of a compound represented by the chemical formula $SiO_x$, where x<2, the first optical thin film 5 is less liable to be detached from the resin substrate 3.

If, in the anti-reflection film according to the present invention, the first optical thin film 5 is mainly composed of titanium nitride, and the first optical thin film 5 is electrically conductive, the first optical thin film 5 can be used as an electrically conductive film in place of an ITO layer used in the conventional anti-reflection film as an electrically conductive film.

The above-described anti-reflection film of the present invention may also be provided on a surface side of the face plate of a display portion of a cathode ray tube.

Figure 3:
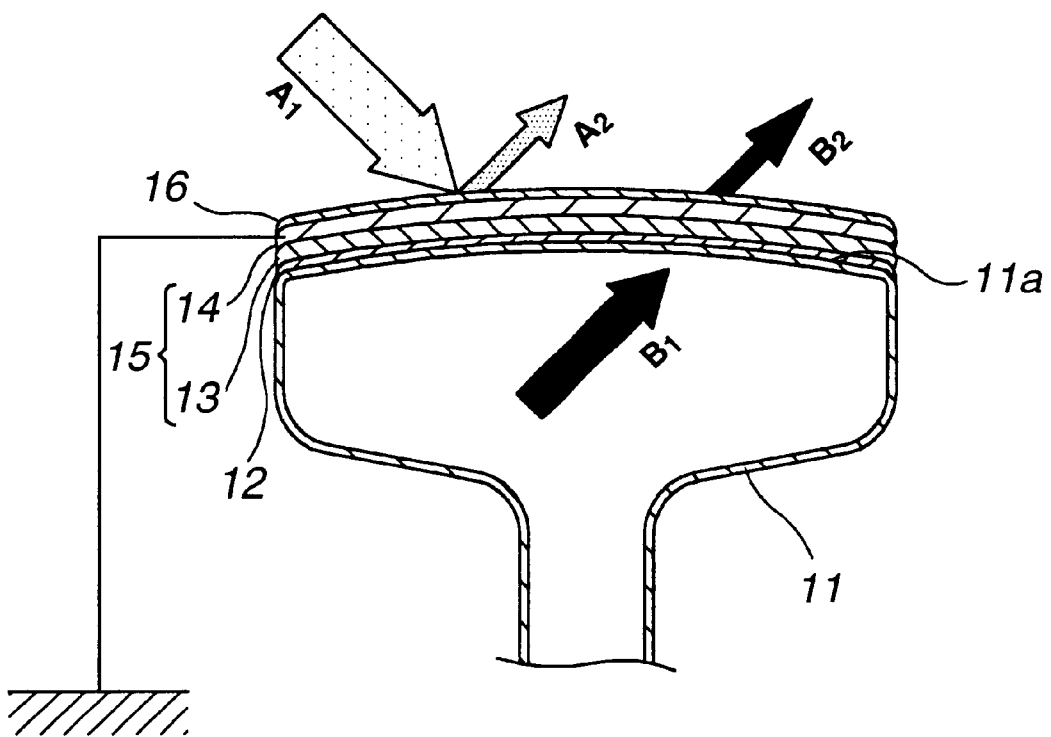
FIG. 3 is a cross-sectional view schematically showing the structure of essential portions of a cathode ray tube according to the present invention.

That is, an anti-reflection film 15 of the present invention, comprised of a resin substrate 13, formed by a thin film substrate and a hard coating layer, and an anti-reflection layer 14, made up of an adhesive layer, a first optical thin film and a second optical thin film, with the anti-reflection layer 14 being layered on the resin substrate 13, is arraigned on a face plate 11a of the cathode ray tube 11, as shown in FIG. 3. An anti-dying layer 16 is also provided on the anti-reflection film 15.

In this case, preferably the first optical thin film of the anti-reflection film 15 is mainly composed of titanium nitride, the first optical thin film is electrically conductive and grounded. That is, the anti-reflection film 14 is grounded in FIG. 3.

With the cathode ray tube of the present invention, in which the anti-reflection film of the present invention is provided on the face plate surface side of the display portion thereof, the anti-reflection characteristics may be optimized, as in the case of the anti-reflection film of the present invention.

If the optical thin film of the anti-reflection film 15 is formed of titanium nitride, the display picture on the cathode ray tube is desirably improved in contrast because of the strong absorption proper to titanium.

In the above-described cathode ray tube 11, the incident light shown by arrow $A_1$ is reflected as shown by arrow $A_2$ as the reflected light of the lesser light volume than that of the incident light shown by arrow $A_1$.

Preferably, the anti-reflection film 14 of the cathode ray tube 11 has the electro-magnetic wave shielding function. That is, the electromagnetic wave, shown by arrow B1 in the cathode ray tube 11, is illuminated to outside, in the direction indicated by arrow B2, as the electromagnetic wave smaller in volume than the electromagnetic wave in the cathode ray tube 11.

The manufacturing method of the above-described anti-reflection film of the present invention is hereinafter explained. First, the hard coating layer 2 is coated on the major surface 1a of the thin-film substrate 1, formed of resin, such as polyethylene terephthalate, to form the resin substrate 3. This hard coating layer 2 may be formed by coating acrylic resin, routinely used in this sort of the anti-reflection film.

The adhesive layer 4 then is formed on the major surface 3a of the resin substrate 3. If this adhesive layer 4 is formed by a compound represented by the chemical formula of $SiO_x$, where x<2, it may be formed by DC or AC sputtering, using silicon as a target. Silicon may be oxidized using a trace amount of oxygen introduced by mass flow controller (MFC), residual background oxygen or moisture. It is noted that the degree of oxidation is determined by the oxygen partial pressure. As a matter of course, if the oxygen partial pressure is lower, the composition is solely of silicon, which is metallized, thus intensifying optical absorption characteristics and impairing anti-reflection characteristics. It is therefore preferred to avoid excessively low the oxygen partial pressure.

The first optical thin film 5 and the second optical thin film 6 then are formed. If the first optical thin film 5 is a thin film formed of TiN, it may be formed by, for example, DC sputtering, using titanium as a target. If the second optical thin film is a thin film formed of $SiO_2$, it may be formed by, for example, AC sputtering, using silicon as a target.

Figure 4:
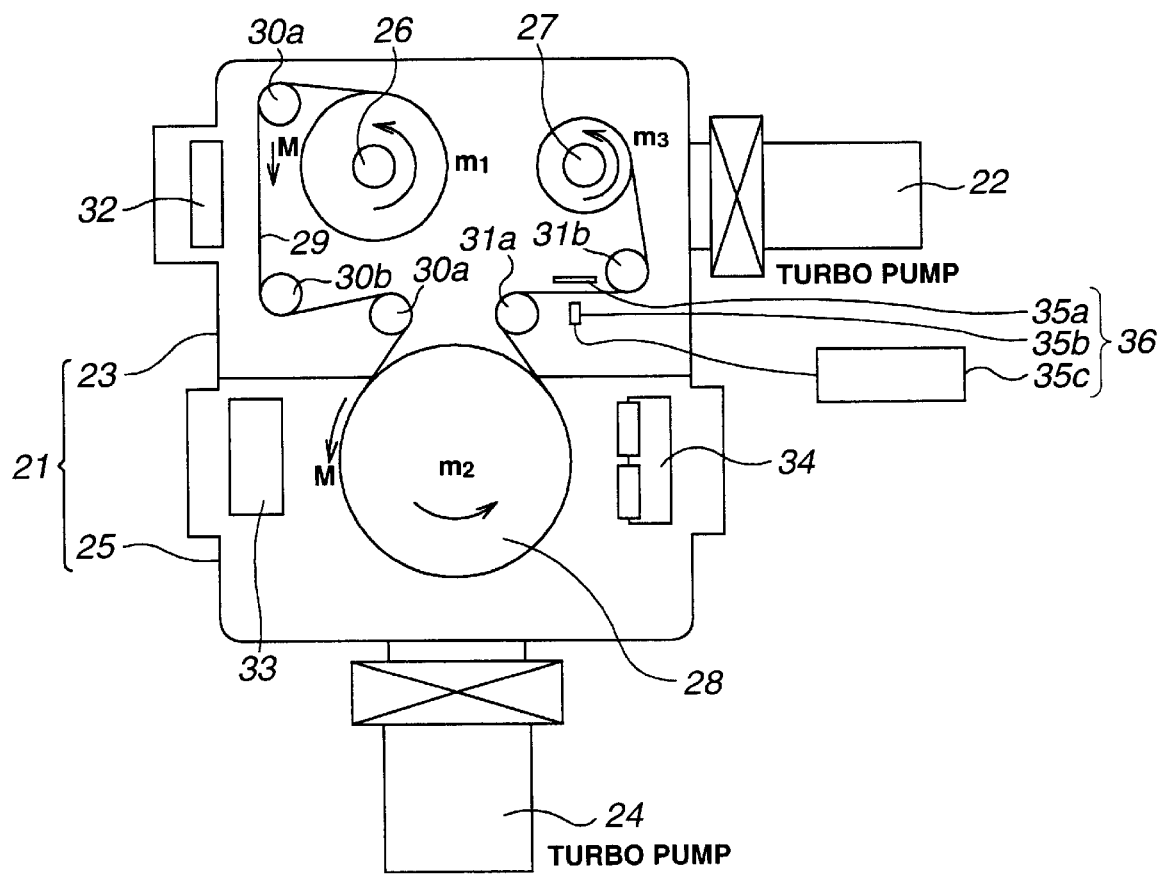
FIG. 4 is a schematic view showing the structure of essential portions of a film-forming device.

If the film forming device shown in FIG. 4 is used, productivity is desirably improved. This film-forming device is configured for forming the thin film by sputtering.

Specifically, a vacuum chamber 21 is divided into a payout/take-up chamber 23 evacuated by a turbo molecular pump 22 having the evacuating capability of, for example, 1000 liters per second, and a film-forming chamber 25, evacuated by a turbo molecular pump 24, having the evacuating capability of, for example, 1500 liters per second. Within the payout/take-up chamber 23, there are provided a cylindrical payout roll 26, rotated counterclockwise, as shown by arrow $m_1$, and a cylindrical roll take-up roll 27, rotated counterclockwise, as shown by arrow $m_3$. Within the film-forming chamber 25, there is arranged a cooling can 28 rotated counterclockwise, as shown by arrow $m_2$. Within the film-forming chamber 25, there is arranged a moisture cooling pump, not shown, for cooling the surface up to approximately −120° C. This cooling pump may be exemplified by a water-pump (registered trade mark) manufactured by the PolyCold Inc.

The resin substrate 29, reeled out from the payout roll 26 within the payout/take-up chamber 23 as indicated by arrow M, is run along the peripheral surface of the film-forming chamber 25 so as to be taken up on the take-up roll 27 in the payout/take-up chamber 23. For permitting smooth running of the resin substrate 29 under a pre-set tension, cylindrical guide rolls 30a, 30b, rotated counterclockwise, and a cylindrical guide roll 31b, rotated counterclockwise, are provided in the payout/take-up chamber 23 between the payout roll 26 and the cooling can 28. There are also provided a cylindrical guide roll 31a, rotated clockwise, and a cylindrical guide roll 31b, rotated counterclockwise, in the payout/take-up chamber 23 between the cooling can 28 and the take-up roll 27. As the resin substrate 29, such a resin substrate may be exemplified which is comprised of a hard coating layer 3 to 6 $\mu$m in thickness provided on a resin substrate of polyethylene terephthalate having a thickness of 188 $\mu$m, a width of 300 nm and a length of 150 mm. Of course, the payout roll 26, cooling can 28, take-up roll 27, guide rolls 30a to 30c and the guide rolls 31a, 31b are sized to support the resin substrate 29 in the width-wise direction.

Meanwhile, in the film-forming device, the payout roll 26, cooling can 28, take-up roll 27, guide rolls 30a and 30b and the guide roll 31b can be rotated not only counterclockwise, as shown by arrow, but also clockwise, while the guide rolls 30c and 31a can be rotated not only clockwise but also counterclockwise, so that the resin substrate 29 taken up on the take-up roll 27 can again be taken up on the payout roll 26.

A high frequency etching device 32 is provided between the payout roll 26 and the cooling can 28, more precisely in an area between the guide rolls 30a and 30b in the film-forming chamber 25, for facing the resin substrate 29.

A titanum target 33 is provided as a single cathode for DC sputtering, between the payout roll 26 and the cooling can 28, more precisely in an area registering with the peripheral surface of the cooling can 28 in the film-forming chamber 25. A silicon target 34 is also provided as a dual cathode for AC sputtering between the cooling can 28 and the take-up roll 27, more precisely at a position registering with the peripheral surface of the cooling can 28 in the film-forming chamber 25. The titanium target 33 may be of a length along the width of the resin substrate 29 of 600 nm and a length along the running direction of the resin substrate 29 indicated by arrow M of 150 mm. The silicon target 34 may be two silicon targets arrayed side by side, each silicon target being of a length along the width of the resin substrate 29 of 600 nm and a length along the running direction of the resin substrate 29 indicated by arrow M of 75 mm.

There is also provided a light transmittance measurement unit 36 having a light illuminating portion 35a and a light receiving portion 36b between the cooling can 28 and the take-up roll 27, more precisely at a position registering with the guide rolls 31a, 31b in the film-forming chamber 25, for sandwiching the resin substrate 29 along the direction of thickness, and a measurement unit 35c for measuring how much of light illuminated by the light illuminating portion 35a arranged outside the vacuum chamber 21 is received by the light receiving portion 36b.

For manufacturing the anti-reflection film according to the present invention by the above-described film-forming device, the following method is used for manufacture.

First, the payout roll 26, cooling can 28, take-up roll 27, guide rolls 30a, 30b and the guide roll 31b are rotated counterclockwise, at the same time as the guide rolls 30c and 31a are rotated clockwise to reel out the resin substrate 29 from the payout roll 26 in the direction indicated by arrow M to etch the resin substrate 29 first by the high frequency etching device 32 to rise the substrate surface. The resin substrate 29 is then caused to run along the periphery of the cooling can 28 so as to be taken up on the take-up roll 27.

The payout roll 26, cooling can 28, take-up roll 27, guide rolls 30a, 30b and the guide roll 31b are rotated clockwise, at the same time as the guide rolls 30c and 31a are rotated counterclockwise to take up again the resin substrate 29, once taken up on the take-up roll 27, on the payout roll 26.

The payout roll 26, cooling can 28, take-up roll 27, guide rolls 30a, 30b and the guide roll 31b then are rotated counterclockwise, at the same time as the guide rolls 30c and 31a are rotated clockwise to reel out the resin substrate 29 from the payout roll 26 in the direction indicated by arrow M to cause the resin substrate 29 to run on the peripheral surface of the cooling can 28 to form an adhesive layer of a compound having the chemical formula of SiOx, where x<2, using the silicon target 34 as a dual cathode by reactive AC sputtering using a plasma emission monitor.

The resin substrate 29 then is run between the light illuminating portion 35a and the light receiving portion 35b of the light transmittance measurement unit 36 to measure the thickness of the adhesive layer 4 formed of a compound represented by the chemical formula SiOx, where x<2. The produce is judged as to acceptability based on the results of measurement, while the subsequent manufacturing conditions are accordingly adjusted. The resin substrate 29, now carrying the adhesive layer, then is taken up on the take-up roll 27.

The rinsing of the surface of the resin substrate 29 by the etching by the high frequency etching device 32 and the formation of the adhesive layer may be carried out in succession.

The payout roll 26, cooling can 28, take-up roll 27, guide rolls 30a, 30b and the guide roll 31b are rotated clockwise, at the same time as the guide rolls 30c and 31a are rotated counterclockwise to take up again the resin substrate 29, once taken up on the take-up roll 27, on the payout roll 26.

The payout roll 26, cooling can 28, take-up roll 27, guide rolls 30a, 30b and the guide roll 31b then are rotated counterclockwise, at the sa me time as the guide rolls 30c and 31a are rotated clockwise to reel out the resin substrate 29 from the payout roll 26 in the direction indicated by arrow M to cause the resin substrate 29 to run on the peripheral surface of the cooling can 28 to form a first optical thin film of titanium nitride, using a titanium target 33 as a single cathode by reactive DC sputtering using a plasma emission monitor.

The payout roll 26, cooling can 28, take-up roll 27, guide rolls 30a, 30b and the guide roll 31b are rotated clockwise, at the same time as the guide rolls 30c and 31a are rotated counterclockwise to take up again the resin substrate 29, once taken up on the take-up roll 27, on the payout roll 26.

The payout roll 26, cooling can 28, take-up roll 27, guide rolls 30a, 30b and the guide roll 31b then are rotated counterclockwise, at the same time as the guide rolls 30c and 31a are rotated clockwise to reel out the resin substrate 29 from the payout roll 26 in the direction indicated by arrow M to cause the resin substrate 29 to run on the peripheral surface of the cooling can 28 to form a second optical thin film of $SiO_2$, using a silicon target 34 as a dual cathode by reactive DC sputtering employing a plasma emission monitor.

This completes an anti-reflection film, comprised of the adhesive layer, first optical thin film and the second optical thin film, sequentially formed on the resin substrate 29. The completed film is taken up of the take-up roll 27.

If the anti-reflection film of the three-layered structure is formed as described above, the manufacturing process is markedly simplified in comparison with the conventional five-layered anti-reflection film, such that the manufacturing process can be managed in a simpler manner to facilitate the manufacture and management.

Also, in the above-described specified embodiment of the anti-reflection film of the present invention, the total film thickness of the adhesive layer 4 and the first and second optical thin films is 106.6 nm, which is markedly smaller than the total film thickness of the above-described conventional anti-reflection film which is 215 nm. The result is that, if a film-forming device in which sputtering can be carried out in succession as a manufacturing device, the substrate running speed can be increased in comparison with the conventional device, thus markedly improving the productivity.

Moreover, in the above-described anti-reflection film of the present invention, it is possible to endow the first optical thin film 5 of titanium with electrical conductivity to use the first optical thin film 5 as an electrically conductive film in place of an ITO layer used as an electrically conductive film in the conventional anti-reflection film. If the ITO thin film, used as an electrically conductive film in the conventional anti-reflection film, is formed by sputtering, so-called nodules, which are a composite material of indium and tin, are produced on the target surface. Therefore, the vacuum chamber needs to be opened after sputtering the substrate by approximately 1000 nm to clean the target surface. This renders continuous film formation difficult such that sputtering can b e re-started only after considerable time lapse to lower the productivity. However, if the above method is used to manufacture the anti-reflection film of the present invention, continuous film formation is facilitated to improve the productivity significantly because the nodules are generated in significantly smaller amounts on the surface of the titanium target 33 than in the case of the ITO layer.

EXAMPLES

For confirming the effect of the present invention, the following experiment was conducted.

First, a reflectance curve was prepared by simulation for a case in which, in the anti-reflection film shown in FIG. 2, the adhesive layer 4 is a thin film 5 nm in thickness, formed of a compound represented by the chemical formula $SiO_x$, where x<2, the first optical thin film 5 is a thin film 13.6 nm in thickness, formed of titanium nitride, and the second optical thin film 6 is a thin film of $SiO_2$, 88 nm in thickness, these having the refractive indices and the extinction coefficient as shown in Table 1. The refractive index of the thin-film substrate 1 of the resin substrate 3 was set to 1.43, while that of the hard coating layer 2 is set to 1.49. The results are shown in FIG. 5, in which the abscissa and the ordinate denote the wavelength and the reflectance, respectively.

| wavelength nm | | 380 | 450 | 550 | 650 | 780 |
|---|---|---|---|---|---|---|
| $SiO_X$ | refractive index n | 2.47 | 2.42 | 2.31 | — | 2.16 |
| (adhesive layer) | extinction coefficients k | 0.51 | 0.24 | 0.089 | — | 0.057 |
| TiN | refractive index n | — | 1.8377 | 1.6033 | 1.5576 | — |
| (first optical thin film) | extinction coefficients k | — | 0.7676 | 0.9001 | 0.9901 | — |
| $SiO_2$ | refractive index n | 1.46 | 1.48 | 1.44 | 1.44 | 1.45 |
| (second optical thin film) | extinction coefficients k | 0 | 0 | 0 | 0 | 0 |

An anti-reflection film, configured as mentioned above, was actually produced and its reflectance curve measured. The results are shown in FIG. 6, in which the abscissa and the ordinate denote the wavelength and the reflectance, respectively.

Figure 5:
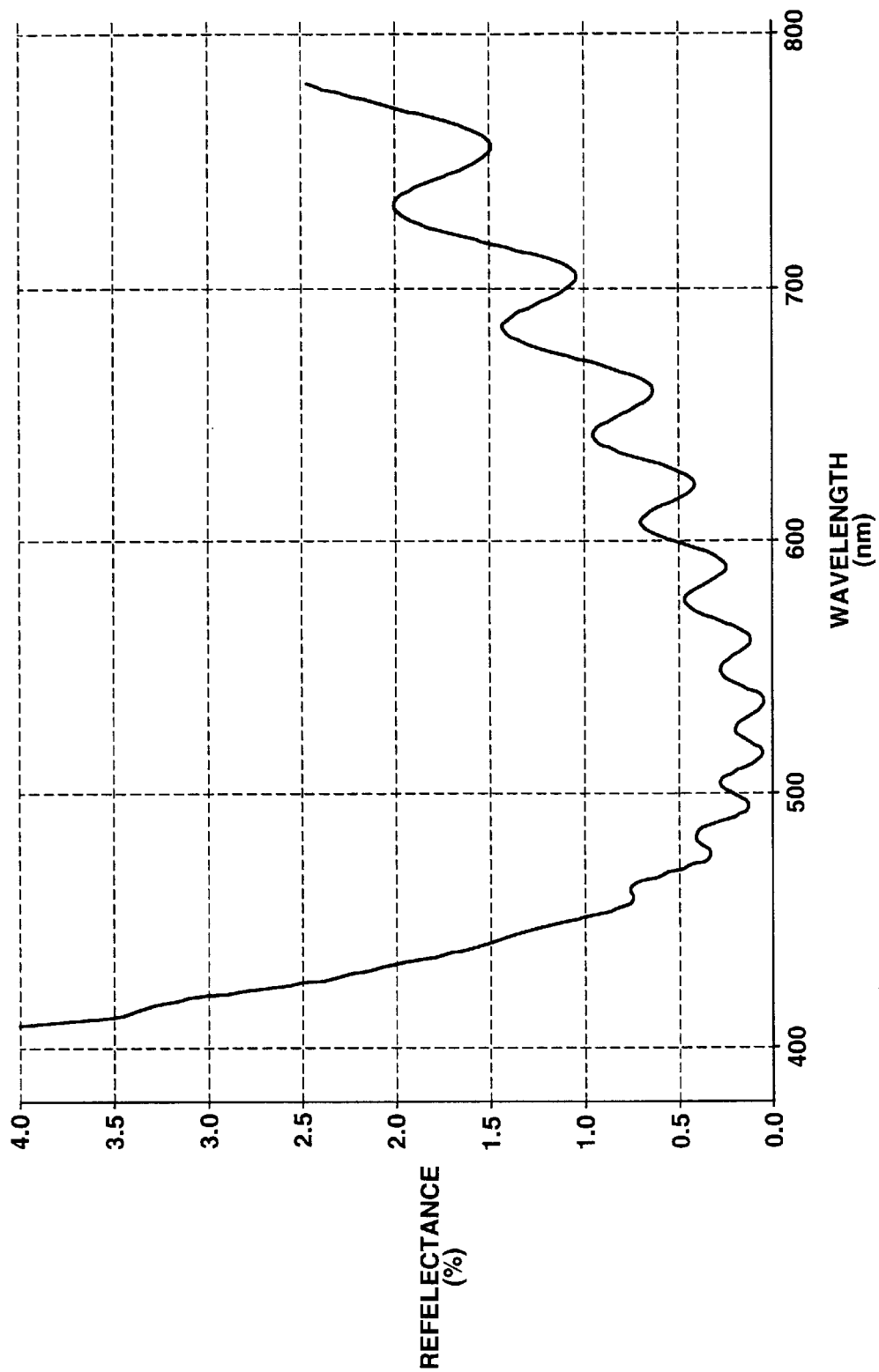
FIG. 5 is a graph showing a typical relation between the wavelength and the reflectance.
Figure 6:
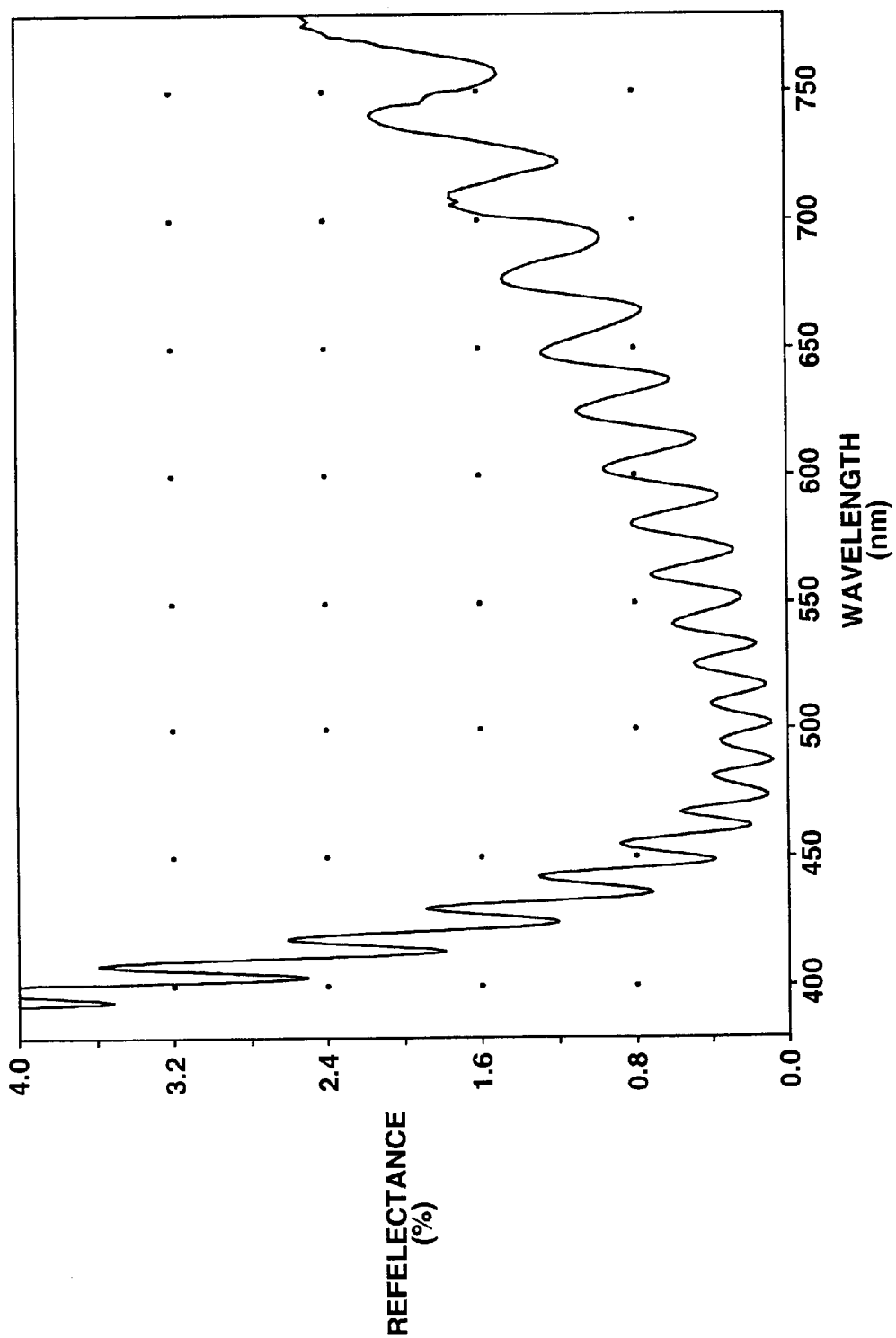
FIG. 6 is a graph showing another typical relation between the wavelength and the reflectance.

As may be seen from comparison of FIGS. 5 and 6, the results of the simulation coincide with the measured results satisfactorily. It is thus apparent that, with the anti-reflection film of the present invention, the reflectance characteristics can be derived from simulation.

Thus, an anti-reflection film was prepared, as the film forming conditions for the first optical thin film 5, in which the adhesive layer 4 is represented by the chemical formula of $SiO_x$, where x<2, and has a film thickness of 5 nm, the first optical thin film 5 is a thin film formed of titanium nitride, and those for the second optical thin film 6 is a thin film of $SiO_2$, having the film thickness of 88 nm, were slightly changed, and the anti-reflection characteristics were also tuned. The reflectance curve of the prepared anti-reflection film was measured. The results are shown in FIG. 7, in which the abscissa and the ordinate denote the wavelength and the reflectance, respectively.

Figure 7:
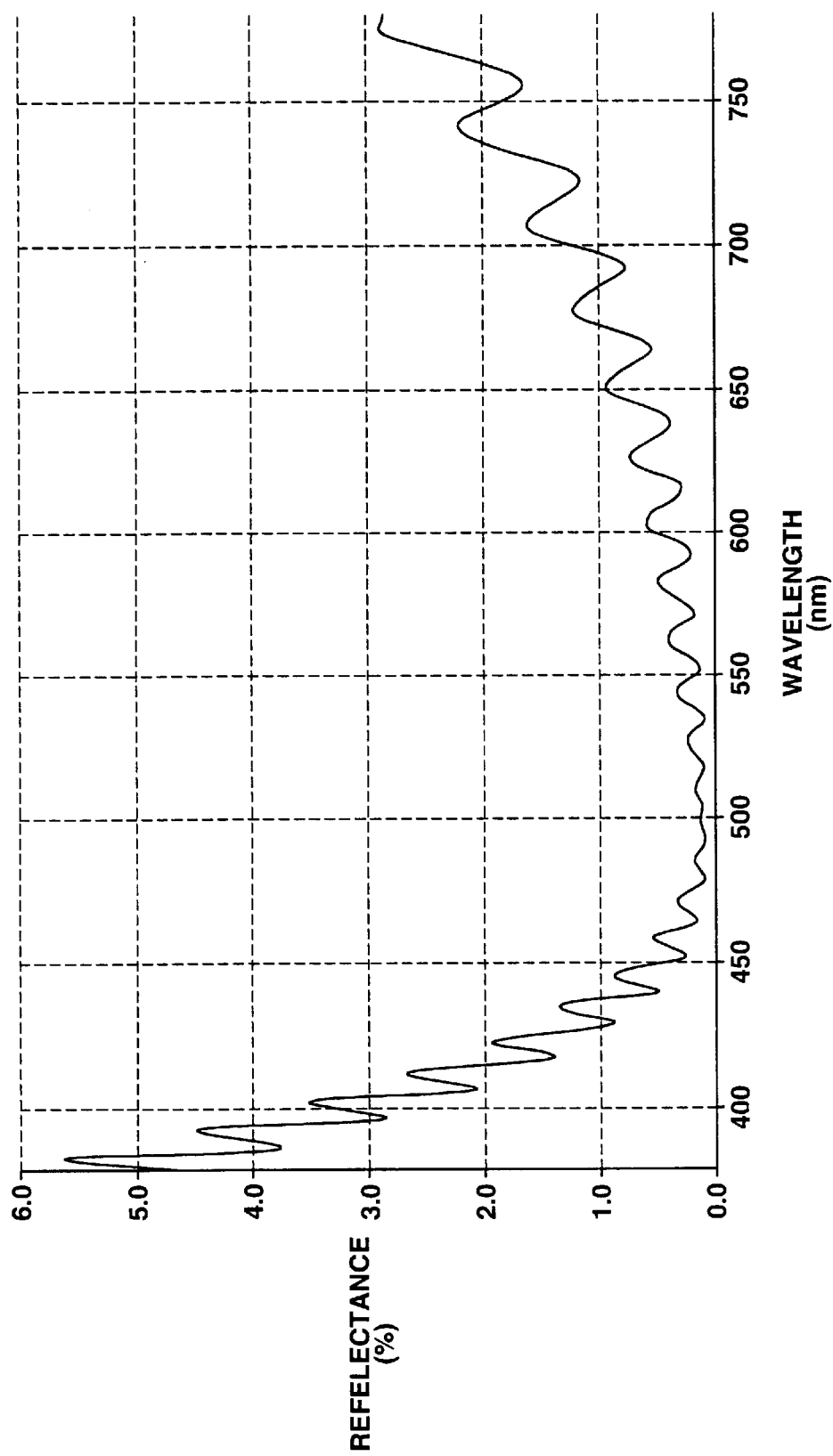
FIG. 7 is a graph showing the relation between the wavelength and transmittance.

It is seen from the results of FIG. 7 that, by adjusting the characteristics of the first optical thin film 5, low transmittance can be realized over a wide wavelength range, that is, optimum reflectance characteristics can be realized over a wide wavelength range. It may be contemplated that, if the characteristics of the other layers are adjusted, low transmittance can be achieved over the wide wavelength range, that is, optimum reflectance characteristics can be realized over a wide wavelength range.

It has now been seen that, by optimizing the film thicknesses, refractive indices or extinction coefficients of the respective layers, according to the present invention, an anti-reflection film can be obtained which is low in transmittance, that is excellent in reflection characteristics, over a wide wavelength range.

It is noted that the sheet resistivity of the present anti-reflection film is of the order of 400 to 2000 Ωcm.

What is claimed is:

1. A cathode ray tube wherein, on a face plate surface side of a display portion, comprising an anti-reflection film having a three-layered structure consisting of an adhesive layer consisting essentially of $SiO_x$ where x<2, the adhesive layer being formed on a major surface of a resin substrate, a first optical thin film consisting essentially of titanium nitride doped with a metal, said first optical film formed on said adhesive layer, and a second optical thin film with a refractive index of 1.35 to 1.7 formed on said first optical thin film, said anti-reflection film being arranged facing said resin substrate.

2. The cathode ray tube according to claim 1 wherein said first optical thin film being electrically conductive and grounded.

3. An anti-reflection film having a three-layered structure consisting of an adhesive layer consisting essentially of $SiO_x$ where x<2 wherein the adhesive layer is formed on a major surface of a resin substrate; a first optical thin film consisting essentially of titanium nitride doped with a metal and being formed on the adhesive layer; and a second optical thin film having a refractive index ranging from 1.35 to 1.7 and being formed on the first optical thin film.

4. The anti-reflection film according to claim 3 wherein the metal is tungsten.

5. The anti-reflection film according to claim 3 wherein the metal is gold.

6. The cathode ray tube of claim 1 wherein the metal is tungsten.

7. The cathode ray tube of claim 1 wherein the metal is gold.

* * * * *